(12) United States Patent
Fahrnbauer et al.

(10) Patent No.: US 6,599,026 B1
(45) Date of Patent: Jul. 29, 2003

(54) OPTICAL FIBER TERMINATION FEATURING ULTRASONIC RETENTION OF A PLASTIC OPTICAL FIBER END

(75) Inventors: Bernhard Fahrnbauer, München (DE); Patrick Weigert, Neufahrn (DE); Hannes Jahn Wendling, Langen (DE); Klaus Wiese, Sulzbach (DE)

(73) Assignees: Bayerische Motoren Werke, Munich (DE); AMP Deutschland GmbH, Langen (DE)

( * ) Notice: Subject to any disclaimer, the term of this patent is extended or adjusted under 35 U.S.C. 154(b) by 106 days.

(21) Appl. No.: 09/421,893

(22) Filed: Oct. 21, 1999

(30) Foreign Application Priority Data

Oct. 23, 1998 (DE) .......................... 198 49 026

(51) Int. Cl.[7] ................................. G02B 6/36
(52) U.S. Cl. ..................... 385/77; 385/84; 385/139
(58) Field of Search ........................ 385/76, 77, 80, 385/84, 86, 139

(56) References Cited

U.S. PATENT DOCUMENTS

| 4,134,641 A | 1/1979 | Kao et al. ................. 385/70 |
| 4,176,909 A | 12/1979 | Prunier ..................... 385/80 |
| 4,510,005 A | 4/1985 | Nijman ..................... 156/221 |
| 4,695,124 A | 9/1987 | Himono et al. ............ 350/96.2 |
| 4,715,675 A | 12/1987 | Kevern et al. ............. 385/80 |
| 5,146,520 A * | 9/1992 | Yuuki et al. ............... 385/45 |
| 5,257,334 A | 10/1993 | Takahashi ................. 384/65 |
| 5,300,162 A | 4/1994 | Brockmeyer et al. ....... 156/73 |
| 5,421,928 A | 6/1995 | Knecht et al. ............. 156/153 |
| 5,778,126 A * | 7/1998 | Saitoh ...................... 385/77 |
| 5,909,528 A * | 6/1999 | Tamekuni et al. .......... 385/137 |
| 6,030,129 A * | 2/2000 | Rosson ..................... 385/81 |

FOREIGN PATENT DOCUMENTS

| DE | 89 08 899 U | 7/1989 | .......... G02B/6/36 |
| DE | 44 21 531 C1 | 6/1994 | .......... G02B/6/36 |
| EP | 0 713 111 A1 | 5/1996 | .......... G02B/6/38 |
| EP | 0 766 110 A1 | 2/1997 | .......... G02B/6/38 |
| JP | 58-108508 | 6/1983 | .......... G02B/7/26 |
| JP | 63137202 | 9/1988 | |
| JP | 08043641 A | 2/1996 | .......... G02B/6/00 |

* cited by examiner

Primary Examiner—Euncha Cherry

(57) ABSTRACT

An optical fiber termination that includes fastening a plastic optical fiber end in a plastic contact tube, wherein the optical fiber end is introduced into the contact tube to a defined position, and the contact tube is subjected to ultrasonic energy whereby the contact tube and optical fiber end are joined together.

17 Claims, 6 Drawing Sheets

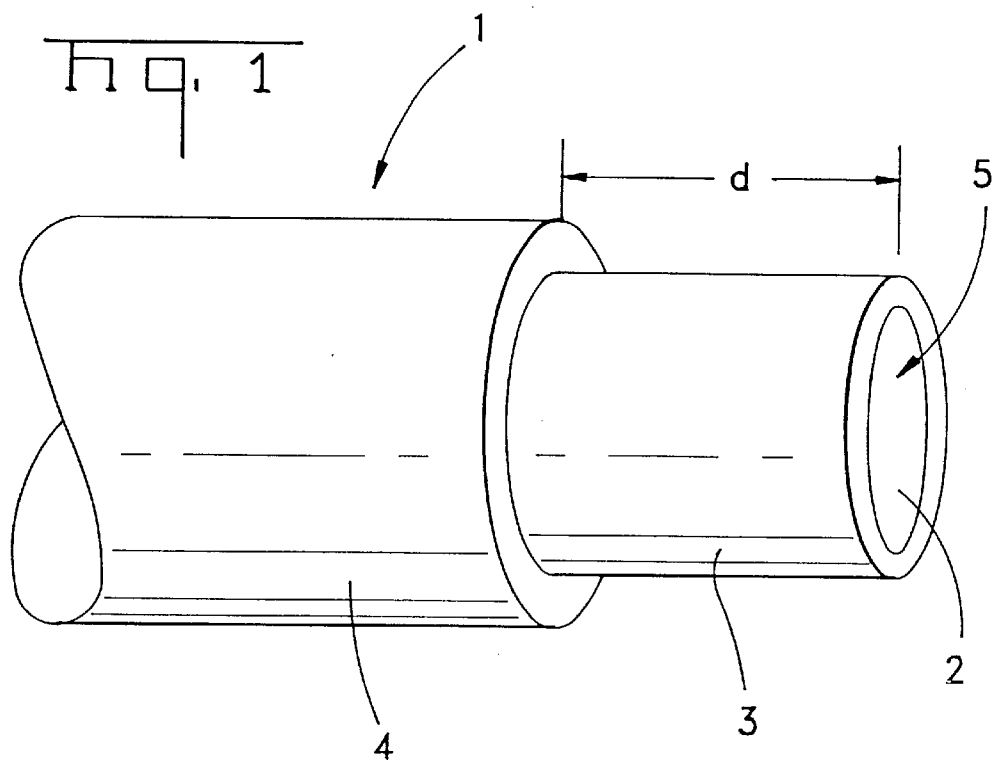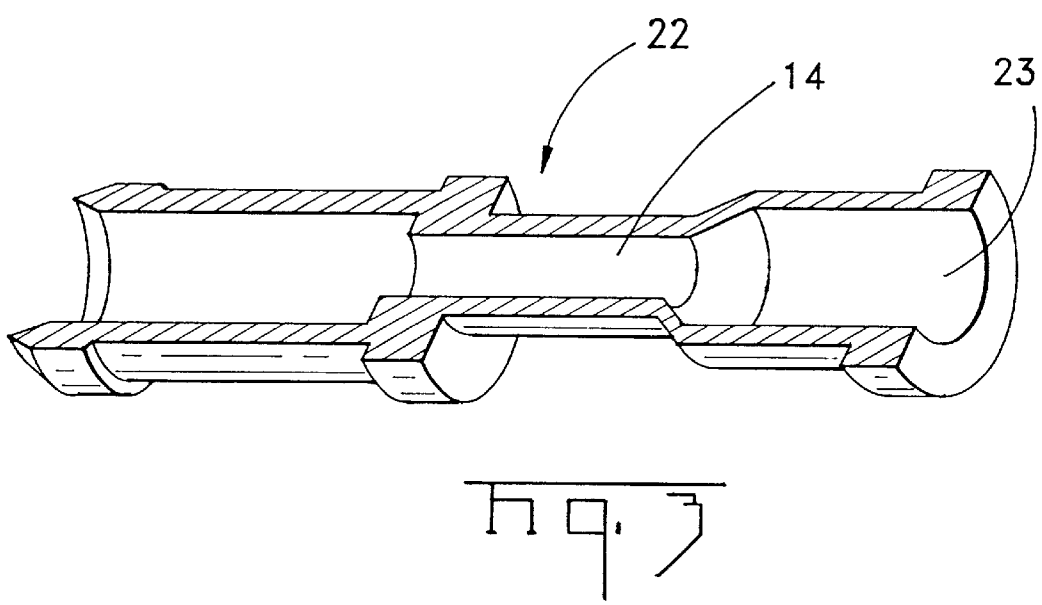

OPTICAL FIBER TERMINATION FEATURING ULTRASONIC RETENTION OF A PLASTIC OPTICAL FIBER END

BACKGROUND OF THE INVENTION

1. Field of the Invention

The invention relates to a plastic contact tube or ferrule and to fastening an end of an optical fiber made of plastic material in the contact tube (or ferrule).

2. Description of the Prior Art

It is known from U.S. Pat. No. 5,421,928 to fix an optical fiber end in a tube (ferrule) in such a way that the end projects beyond the end face of the tube, then to cut-off the end by means of a laser and subsequently to polish the end face of tube and optical fiber.

It is known from JP 58-108508 A to fix a fiber end in a tube by pushing against an end face. The fiber is then provisionally retained in the tube. The fiber end is heated and thus cleaned and smoothed, whereupon the fiber is fixed to the tube.

It is known from U.S. Pat. No. 4,510,005 to introduce a fiber end into a tube and to press the end against a highly polished surface. Heating of this end surface causes the surface of the fiber end to melt and to adapt itself to the highly polished surface. Simultaneously with the heating, it is possible to activate an adhesive located between the fiber and the tube and thus fix the fiber in the tube.

It is also known from U.S. Pat. No. 4,695,124 to fuse an optical fiber within a tube by means of heat where the fiber and tube consist of plastic material.

SUMMARY OF THE INVENTION

An optical fiber end made of plastic can be fused with a plastic tube in a particularly simple and inexpensive manner. A method of this type can be carried out, for example, by heat treatment. A drawback of this method is that spatially targeted application of heat to a specific location is very difficult.

Starting from this state of the art, the object of this invention is to provide for reliably fastening an end of a plastic optical fiber in a ferrule or tube made of plastic material. Additionally, it is an object to provide a suitable plastic ferrule or tube.

A defined position of the optical fiber end in the contact tube is provided during introduction of the optical fiber end into the plastic tube. The defined position is achieved in that the optical fiber end is positioned relative to the end face of the plastic tube. The optical fiber end which is to be introduced and which comprises an outer sheath is finished at the end face and freed from the outer sheath over a predetermined length. Positioning with respect to the end face of the contact tube takes place during introduction of the optical fiber end into the contact tube. It is immaterial whether the contact tube is formed in one part and the optical fiber end is inserted from one end or whether the contact tube consists of two shells which are joined together.

The forces for extraction of the optical fiber end from the contact tube can be increased by fusing the optical fiber end with the contact tube. This can be effected in the region of the outer sheath as well as in the region of the primary sheath or core of the optical fiber. Particularly high retention forces are achieved because the contact tube and the optical fiber are fused together along both the outer sheath and the primary sheath or core. It is particularly advantageous to fuse the primary sheath or core to the contact tube as a change in the end face position of the optical fiber due to differing thermal expansion can be avoided.

It is also particularly advantageous if the wall of the bore of the contact tube is structured with ribs or teeth that engage the optical fiber because increased extraction forces can also be achieved in this way. The structure not only improves clamping of the optical fiber but also can be useful to establish fusion at defined points between the optical fiber and the contact tube when the contact tube is charged with ultrasound.

It is also particularly advantageous to divide the contact tube longitudinally, at least in certain regions, into two half shells which are later joined together by ultrasound with the fiber therebetween. The optical fiber will be compressively clamped between the two half shells. The half shells can also be joined together by corresponding catch/latch structure. Structures on the wall of the bore where the optical fiber is positioned can also be produced particularly easily owing to the forming of the contact tubes as two half shells. Therefore, the structure can have almost any form, for example a rib-shaped, waffle-shaped, pyramid-shaped or cylindrical cone-shaped configurations.

It is particularly advantageous that, with a contact tube consisting of two half shells, the optical fiber will not only be clamped but also welded to the shells by ultrasound. A particularly advantageous fastening of the optical fiber end in the contact tube is achieved if the optical fiber end is clamped along the region of the outer sheath and then ultrasonically welded to the contact tube in the region of the primary sheath or core.

A further feature is that the two half shells can include centering and positioning pins or corresponding recesses for the relative positioning thereof when the shells are being joined together.

It is also particularly advantageous if the half shells comprise, in the region of the faces which are joined together, welding ribs as ultrasonic guides to simplify welding by directing the ultrasound energy.

Finally, it is possible for the invention to be constructed as a single-part contact tube, the structure on the wall of the bore can have the form of a thread or of longitudinal ribs. The tube can then be ultrasonically welded to the optical fiber end, but additional clamping does not occur only the deformation of the external geometry of the optical fiber during insertion.

It is also particularly advantageous if two types of contact shell are provided. The first contact shell being formed with a receiving region at an end face. The second contact shell having an end face being formed in such a way that it can be introduced into the receiving region of the first contact shell. The two plastic contact shells in cooperation with respective optical fiber ends can mate in the manner of a socket and a pin contact.

It is also particularly advantageous to design the half shells hermaphroditically. An inexpensive contact tube, which is simple to produce, is thus provided.

BRIEF DESCRIPTION OF THE DRAWINGS

FIG. 1 is a perspective view of an optical fiber end, which is suitably finished for introduction into the contact tube of the present invention;

FIG. 3 is a perspective view of a single-part contact tube according to the present invention cut longitudinally;

DETAILED DESCRIPTION OF THE PREFERRED EMBODIMENT

Figure 2:
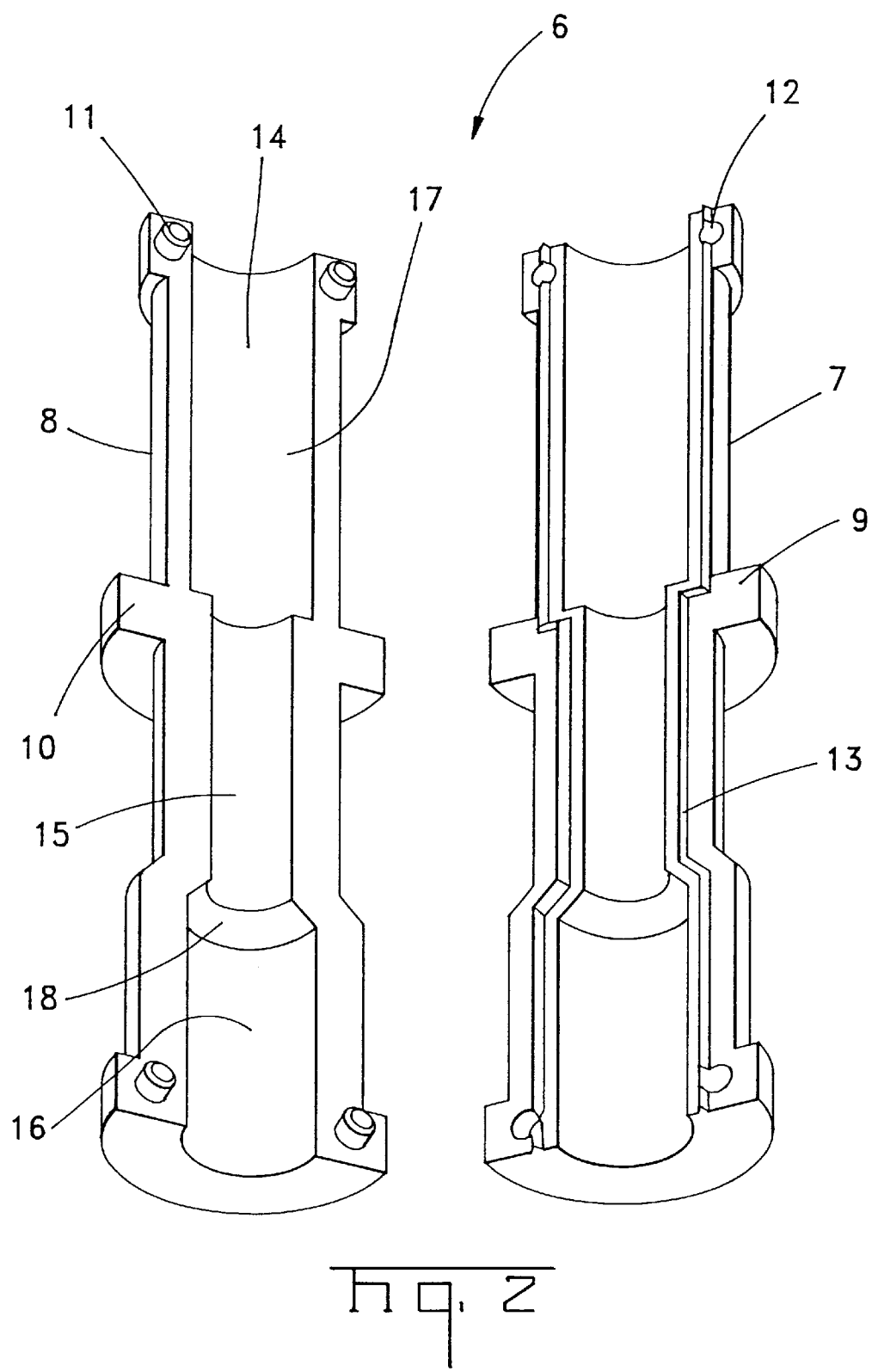
FIG. 2 is a perspective view of two half shells that can be joined together to form a contact tube according to the present invention.

FIG. 1 is a perspective view of an optical fiber end 1. The optical fiber and therefore also the optical fiber end 1 consist of a core 2 of a plastic material that serves as the light conduit, a primary sheath 3 surrounding the core 2 and an outer sheath 4 that in turn is surrounding the primary sheath 3. The sizes of core 2, primary sheath 3 and outer sheath 4 are such that the core 2 has a diameter, for example, of 1 mm whereas the primary sheath 3 has a thickness of 0.1 mm to 0.2 mm and the outer sheath 4 has a thickness of about 0.5 mm. The total diameter of the optical fiber is about 2.2 mm to 2.4 mm. To terminate the optical fiber end 1, the outer sheath 4 is removed from the primary sheath 3 over a length d. The end face 5 of the optical fiber end is then prepared to allow an emergence, which is as far as possible undamped by irregularities in the end face 5, of light from the core 2. The optical fiber end 1 is prepared and can now be introduced into a corresponding contact tube.

FIG. 2 shows a contact tube 6 for receiving an optical fiber end 1 as prepared in the discussion above. The contact tube 6 consists of two half shells 7, 8. The two half shells 7, 8 have substantially the form of a half hollow cylinder, which has been separated along the longitudinal cylinder axis. At the mating interfaces 9, 10 which face each of other when the half shells 7, 8 have been assembled, centering or positioning pins 11 are situated on one side and centering bores 12 on the opposite side. By means of these pins and bores 11, 12, the two shells 7, 8 are positioned relative to one another during assembly. Furthermore, one half shell 7 of the two half shells 7, 8 comprises a welding rib 13 which is also used as an ultrasonic direction guide and, when ultrasonically welding together the two half shells 7, 8, represents a highly heated point which will fuse with the opposing face 10 of the other contact shell 8.

After the fusion of the two half shells 7, 8, a hollow cylinder with a bore 14 is formed. The surface of the bore 14 can also be seen on the half shells 7, 8 prior to assembly of the half shells 7,8. The bore 14 comprises three different regions. A first region 15 is of small diameter for receiving the optical fiber end 1 without outer sheath 4. An adjoining second region 16 is of larger diameter for receiving the optical fiber end 1 with outer sheath 4. Between the first and the second region 16 of the bore is a shoulder 18 which serves as a locating feature for the defined positioning of the optical fiber end 1. Finally, a receiving region 17 is opposite the second adjoining region 16. The receiving region 17 is also adjoining the other side of the first region 15. This receiving region 17 will serve to receive a complementary optical connector, also having an optical fiber end, that has a pin-shaped configuration that can be inserted into the region 17 for optical coupling of the fibers.

The optical fiber end 1 will be fastened in the contact tube 6 in the following manner. As described above, the optical fiber end 1 is first freed from the outer sheath 4 over a region d and the end face of the core is then finished. The optical fiber end 1 is then inserted into one of the half shells 7, 8, in such a way that the end of the outer sheath 4 comes to rest before shoulder 18. The stripped length d of the optical fiber end 1 is so dimensioned that the end face 5 of the optical fiber end 1 comes to rest at the transition between the first region 15 and the third region 17. Once the optical fiber end 1 has been inserted, the two contact shells 7,8 are assembled and welded together and to the fiber end by exposure to ultrasound energy (see FIG. 8). The internal clearance of at least one of the two regions, the first region 15 or the second region 16, is dimensioned to be slightly undersized relative the diameter of the optical fiber end 1. The optical fiber end 1 will therefore be clamped in the bore of the contact tube 6.

If such compressive clamping upon the fiber is not desired, it is also possible to introduce the optical fiber end between the two half shells 7, 8 and then to allow an ultrasonic transmitter to act upon the contact tube 6 from the exterior to cause the wall of the bore to fuse with the outer sheath or the primary sheath or with both. High extraction forces are thus achieved without pressure being exerted on the core of the optical fiber, which could cause an increase in the damping values relative the light transmission therethrough.

If clamping of the optical fiber end in the contact tube 6 is to be avoided, it is also possible to design the contact tube 6 as a single-part hollow cylinder 22. FIG. 3 shows a perspective view of a hollow cylinder 22 cut along the longitudinal axis. The optical fiber end 1 can be inserted from one end 23 into the bore 14 of the contact tube or of the hollow cylinder 22. Once the optical fiber end 1 is correctly positioned, an ultrasonic connection between the contact tube and the optical fiber end is established and the optical fiber end 1 is firmly held in the contact tube 22.

While the optical fiber end 1 is best fastened in the contact tube 22 by ultrasound. It is particularly helpful if the bore 14 of the contact tube a retention enhancing structure formed along the wall. The structure can take on the form of, for example, longitudinal ribs or a thread forming an ultrasonic weld with the optical fiber end 1 is thus simplified. In order to achieve particularly high retention and ease of assembly, structure in the form of a thread is preferred. Instead of a coaxial bore with a round cross-section, the contact tube can also have a longitudinal orifice with a square or triangular cross-section which is also arranged coaxially to the cylinder axis of the contact tube.

Figure 4:
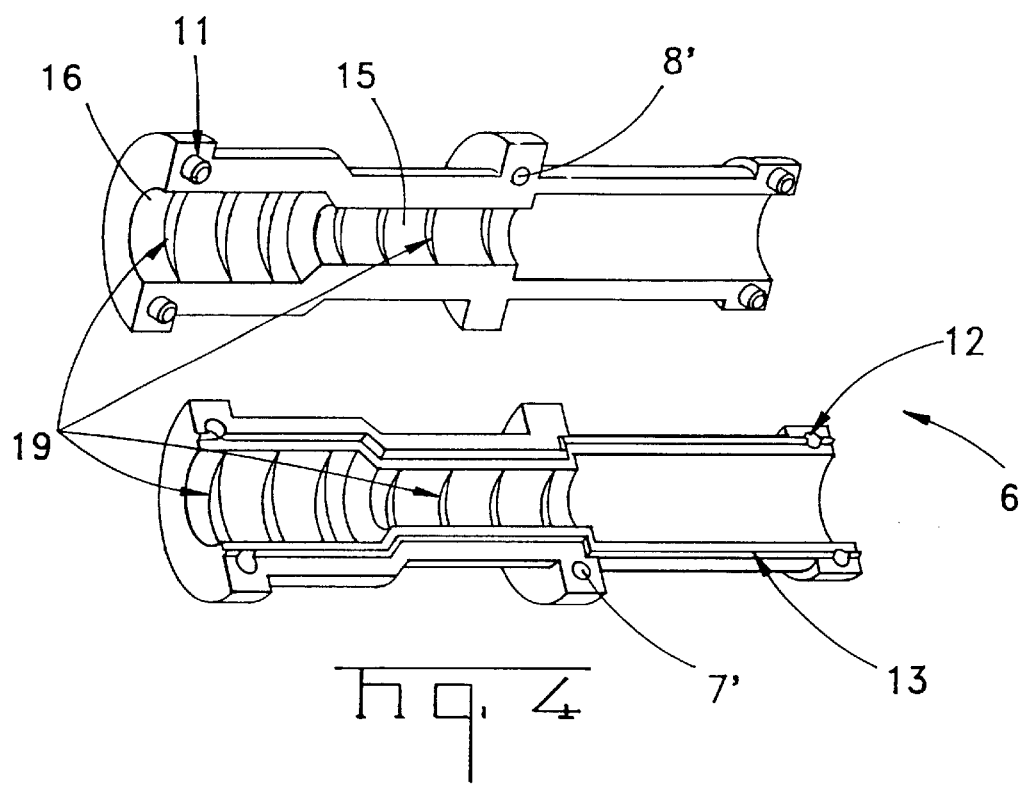
FIG. 4 is a perspective view of two half shells of a contact tube according to the present invention with structure for engaging the fiber along a bore.
Figure 5:
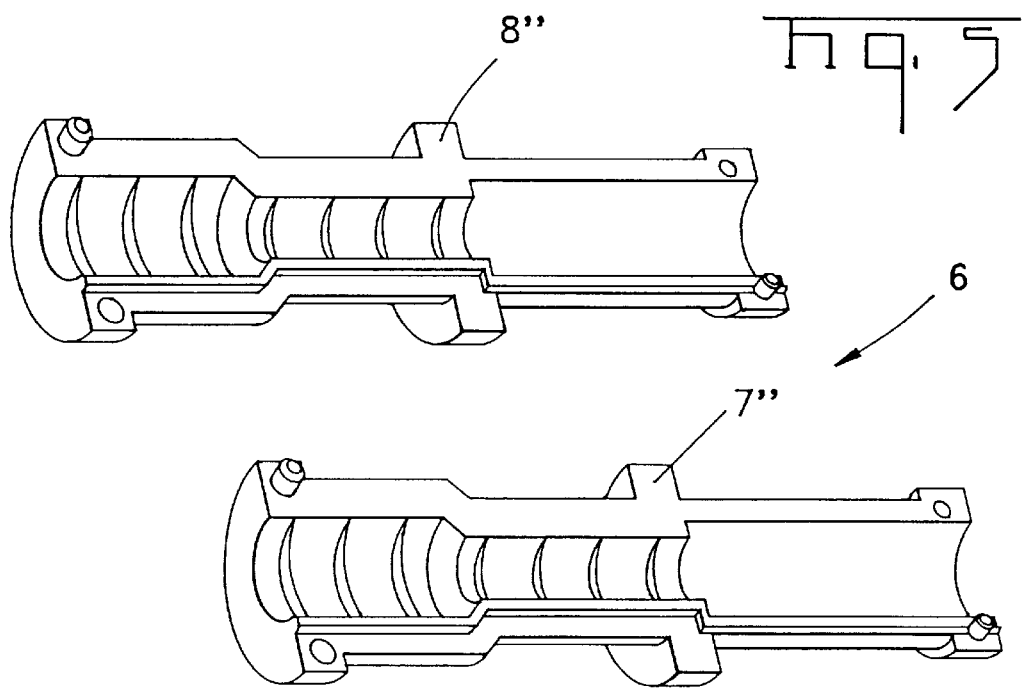
FIG. 5 is a perspective view of two hermaphroditic half shells.

FIG. 4 shows a further contact tube 6. This contact tube 6 also consists of two half shells 7', 8'. The half shells 7', 8' differ from the half shells 7, 8 according to FIG. 2 in that there is a structure 19 formed along the wells that define the bore. The structure 19 is located both in the first region 15 and in the second region 16 of the bore and is provided in both half shells. The structure 19 is designed in the form of transverse ribs. During the ultrasonic welding of the contact tube 6 to the optical fiber end 1, these transverse ribs fuse with the outer or primary sheath of the optical fiber end 1. FIG. 5 also shows another set of two similar half shells 7", 8" of a contact tube 6. These contact shells 7", 8" have a hermaphroditic configuration.

Figure 6:
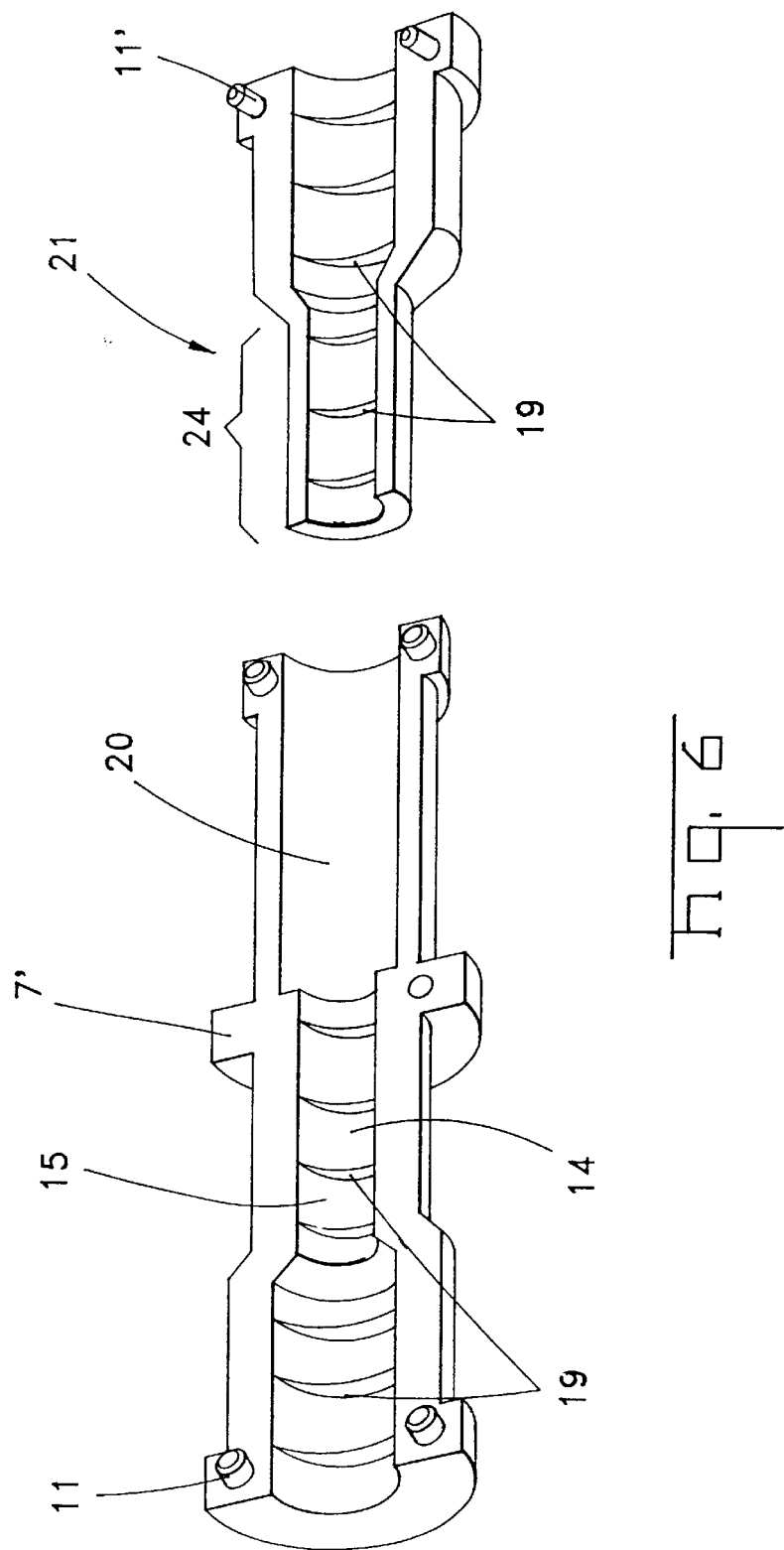
FIG. 6 shows a perspective view of first and second matable half shells representing pin and sockets respectively.

In FIG. 6, the lower half shell 7' according to FIG. 4 is accordingly shown again with ribs 19. As already mentioned hereinbefore, the bore 14 comprises a receiving region 20, which adjoins the first region 15 of the bore. A second lower contact shell 21 is shown next to this lower contact shell 7'. This second lower contact shell 21 essentially also has the form of a half hollow cylinder. It also possesses positioning pins 11' and is formed with transverse ribs 19 inside a bore. It is constructed to be assembled to a corresponding upper contact shell and is intended to receive an optical fiber end in a similar manner to that described. The front region 24 of the contact shell has a pin-shaped configuration. If the two contact half shells 7',21 are assembled with their corresponding complementary contact half shells, a pin-shaped plastic contact is thus formed having an optical fiber end adapted to be received in the receiving region 20 of the socket-shaped plastic contact. Therefore, optical fibers can be coupled to one another by means of the plastic contact in a simple manner such as pin contacts and socket contacts.

Figure 7:
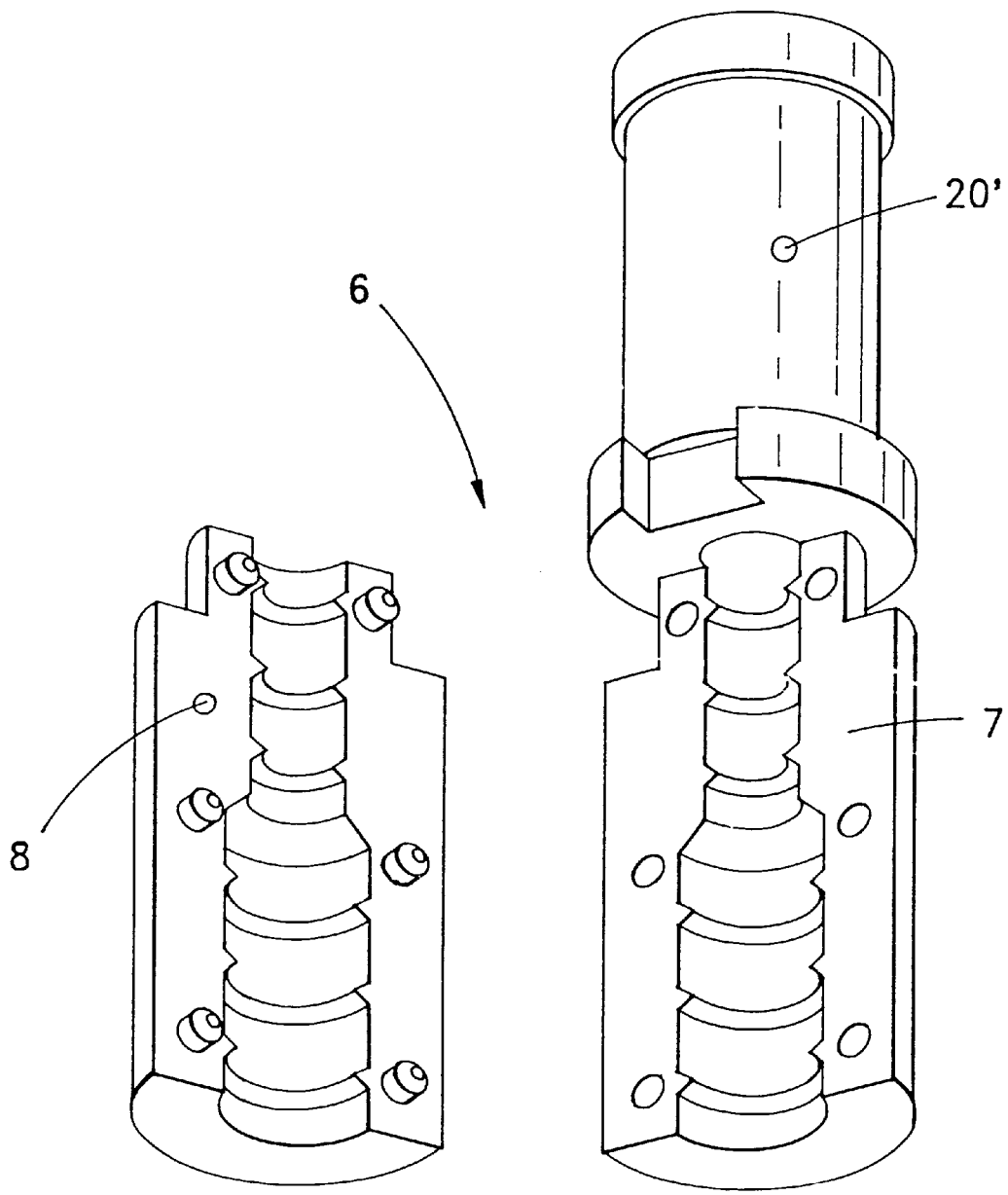
FIG. 7 shows an alternative contact tube consisting of two half shells, one of the half shells additionally having a cylindrical receiving region.

To obtain the accuracy of the receiving region 20, in particular of the bore of this receiving region, in a particularly accurate manner, it may be desirable not to divide the contact tube 6 into half shells at the receiving region 20. FIG. 7 shows such an embodiment. The two half shells 7,8 exist only in the optical fiber reception region whereas a hollow cylinder 20' is formed as part of one of the half shells 7. This ensures that the alignment accuracy of the bore 14 is very high relative the region of the receiver 20.

Figure 8:
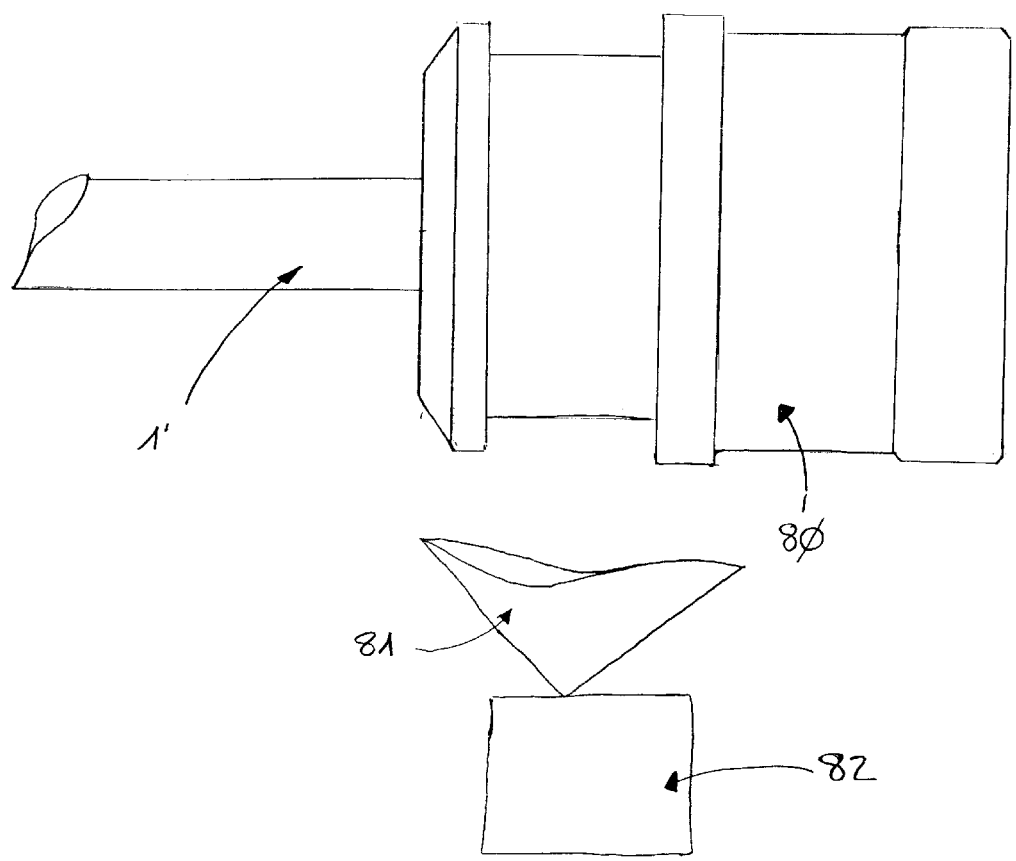
FIG. 8 shows a representational contact tube with a plastic optical fiber end inserted therein subjected to ultrasonic energy.

With reference to FIG. 8, a representational contact tube 80 formed according to any of the above described configurations is provided and a plastic optical fiber end 1' is positioned in the contact tube 80 either by inserting into a single piece tube or seating the plastic optical fiber end 1' in one of the halves, as was described above, and fitting the other half thereto. This assembly is then subjected to ultrasonic energy 81 from an ultrasonic transmitter 82 such that the contact tube 80 and the plastic optical fiber end 1' are bonded together.

We claim:

1. A method of forming an optical fiber termination comprising the steps of:

forming a contact tube from plastic material with an inner bore having structure and an outer surface for locating the contact tube where the inner bore is concentric to the outer surface, the contact tube being formed as two longitudinally split halves, each including a portion of the inner bore;

positioning a plastic optical fiber end in the inner bore by seating the plastic optical fiber end in one of the split halves such that the plastic optical fiber engages the structure, fitting the other split half thereto, and joining the split halves together;

and exposing the contact tube with the plastic optical fiber end therein to ultrasonic energy so that the structure fuses to the plastic optical fiber at defined points and the split halves and plastic optical fiber are bonded together.

2. The method of claim 1 further including the steps of forming the inner bore to have stepped diameters where a larger diameter section is followed by a smaller diameter section with a transition formed therebetween; preparing the optical fiber end by removing an outer sheath thereof to expose a portion of a primary sheath surrounding the core; and the positioning is accomplished by inserting the plastic optical fiber end into the inner bore until the outer sheath abuts the transition.

3. An optical fiber termination comprising:

a contact tube formed of a plastic material and having an inner bore and an outer surface for locating the contact tube, the inner bore being concentric with respect to the outside surface the contact having two half shells split longitudinally along the inner bore where each include a portion thereof, the half shells being joined together to form the tube;

structure along the inner bore that defines fusion points; and a plastic optical fiber end positioned in the inner bore retained therein by ultrasonic welding that fuses the inner bore to the optical fiber.

4. The optical fiber termination according to claim 3, wherein the structure along the inner bore engages the optical fiber end when clamped therebetween.

5. The optical fiber termination according to claim 4, wherein the inner bore has stepped diameters with a first region of small diameter being provided to receive the optical fiber end with an outer sheath thereof removed and a second region of larger diameter to receive the optical fiber end with outer sheath thereupon.

6. The optical fiber termination according to claim 5, wherein said structure formed along the bore is located in both of the stepped diameter regions.

7. The optical fiber termination according to claim 5, wherein the structure is ribs extending transverse to a longitudinal direction of the bore.

8. The optical fiber termination of claim 3 wherein ultrasonic welding is utilized to both secure the half shells to each other and to bond the plastic fiber to each of the half shells.

9. The optical fiber termination of claim 3, wherein the inner bore is dimensioned smaller than the plastic optical fiber end such that the plastic optical fiber end is clamped between the two shells.

10. The optical fiber termination of claim 3, wherein one shell has a welding rib that fuses with the other shell when the tube is ultrasonically welded.

11. A plastic optical fiber termination comprising:

a plastic contact tube having a fiber receiving inner bore dimensioned smaller than a plastic optical fiber end, the tube being formed of two half shells; and, the plastic optical fiber end positioned in the inner bore such that the plastic optical fiber end is clamped between the two shells and bonded thereto by ultrasonic welding.

12. The optical fiber termination of claim 11 wherein the half shells have structure along the inner bore that engage the optical fiber end when clamped therebetween.

13. The optical fiber termination of claim 12 wherein the inner bore has step diameters with a first region of small diameter being provided to receive the optical fiber and with an outer sheath thereof removed and a second region of larger diameter to receive the optical fiber and with outer sheath thereupon.

14. The optical fiber termination of claim 13 wherein said structure formed along the bore is located in both of the stepped diameter regions.

15. The optical fiber termination of claim 14 wherein the structure is in the form of ribs extending transverse to the longitudinal direction of the bore.

16. The optical fiber termination of claim 11, wherein one shell has a welding rib that fuses with the other shell when the tube is ultrasonically welded.

17. The optical fiber termination of claim 11, wherein the inner bore has structure that defines fusion points such that when the tube is ultrasonically welded the structure fuses to the optical fiber.

* * * * *